United States Patent
Karroumi et al.

(10) Patent No.: US 9,177,162 B2
(45) Date of Patent: Nov. 3, 2015

(54) METHOD AND DEVICE FOR SECURED ENTRY OF PERSONAL DATA

(75) Inventors: Mohamed Karroumi, Rennes (FR); Eric Diehl, Liffre (FR)

(73) Assignee: Thomson Licensing (FR)

(*) Notice: Subject to any disclaimer, the term of this patent is extended or adjusted under 35 U.S.C. 154(b) by 0 days.

(21) Appl. No.: 13/704,377

(22) PCT Filed: Jun. 15, 2011

(86) PCT No.: PCT/EP2011/059948
§ 371 (c)(1),
(2), (4) Date: Dec. 14, 2012

(87) PCT Pub. No.: WO2011/157754
PCT Pub. Date: Dec. 22, 2011

(65) Prior Publication Data
US 2013/0091583 A1    Apr. 11, 2013

(30) Foreign Application Priority Data
Jun. 15, 2010   (FR) ...................................... 10 54742

(51) Int. Cl.
*G06F 17/30* (2006.01)
*G06F 21/60* (2013.01)
*G06F 3/023* (2006.01)
(Continued)

(52) U.S. Cl.
CPC ............ *G06F 21/604* (2013.01); *G06F 3/0236* (2013.01); *G06F 3/04886* (2013.01); *G06F 21/83* (2013.01); *G07F 7/1041* (2013.01)

(58) Field of Classification Search
CPC ... G06F 3/0426; G06F 3/04892; G06F 3/038; G06F 3/03547; G06F 3/0412; G06F 1/1673; G06F 1/1692; G06F 3/0219; G06F 3/0317; G06F 3/04886

USPC ....................................................... 726/26, 30
See application file for complete search history.

(56) References Cited

U.S. PATENT DOCUMENTS 5,168,269 A * 12/1992 Harlan .......................... 715/856
5,917,472 A *  6/1999 Perala .......................... 345/157
(Continued)

FOREIGN PATENT DOCUMENTS

| CN | 1298143 | 6/2001 |
| CN | 1333495 | 1/2002 |

(Continued)

OTHER PUBLICATIONS

BeaverPants, Dec. 31, 2002, Real Time Forum, pp. 1-6.*
(Continued)

*Primary Examiner* — Luu Pham
*Assistant Examiner* — Jenise Jackson
(74) *Attorney, Agent, or Firm* — Jack Schwartz & Associates, PLLC (57) ABSTRACT

A method for secured entry of personal data is disclosed. This method comprises for each item of personal data a first step of presentation of a virtual keyboard comprising keys and a first cursor, followed by a step of selection of a key corresponding to the item of personal data wherein the virtual keyboard also comprises at least one dummy cursor and wherein the position on the virtual keyboard of the at least one dummy cursor depends on the position of the first cursor. A device for secured entry of personal data configured to implement the method is further disclosed.

8 Claims, 6 Drawing Sheets

(51) Int. Cl.
*G06F 3/0488* (2013.01)
*G06F 21/83* (2013.01)
*G07F 7/10* (2006.01)

(56) References Cited

U.S. PATENT DOCUMENTS

| | | | |
|---|---|---|---|
| 6,408,391 B1* | 6/2002 | Huff et al. | 726/22 |
| 6,563,498 B1* | 5/2003 | Hirata et al. | 345/419 |
| 7,143,440 B2* | 11/2006 | Ginzberg | 726/18 |
| 7,451,133 B2* | 11/2008 | Yoaz et al. | 1/1 |
| 2002/0188872 A1* | 12/2002 | Willeby | 713/202 |
| 2002/0190946 A1* | 12/2002 | Metzger | 345/156 |
| 2004/0080529 A1 | 4/2004 | Wojcik | |
| 2004/0111646 A1 | 6/2004 | Little | |
| 2004/0257338 A1* | 12/2004 | Maille et al. | 345/156 |
| 2005/0131880 A1* | 6/2005 | Yoaz et al. | 707/3 |
| 2006/0164693 A1* | 7/2006 | Matsumoto et al. | 358/3.28 |
| 2006/0206919 A1 | 9/2006 | Montgomery et al. | |
| 2006/0242421 A1 | 10/2006 | Hsu | |
| 2007/0182714 A1 | 8/2007 | Pemmaraju | |
| 2007/0209014 A1 | 9/2007 | Youmtoub | |
| 2008/0098222 A1* | 4/2008 | Zilberman | 713/170 |
| 2008/0115078 A1 | 5/2008 | Girgaonkar | |
| 2009/0006941 A1* | 1/2009 | Yoshida | 715/227 |
| 2009/0106825 A1* | 4/2009 | Cerruti et al. | 726/5 |
| 2009/0106827 A1* | 4/2009 | Cerruti et al. | 726/7 |
| 2010/0085313 A1* | 4/2010 | Rider | 345/173 |
| 2010/0315328 A1* | 12/2010 | Marcus et al. | 345/156 |
| 2011/0202493 A1* | 8/2011 | Li | 706/50 |
| 2013/0151967 A1* | 6/2013 | Kerr et al. | 715/716 |

FOREIGN PATENT DOCUMENTS

| | | |
|---|---|---|
| CN | 101183412 | 5/2008 |
| JP | 2010423 | 1/1990 |
| JP | 2001350590 | 12/2001 |
| JP | 2006/343873 | 12/2006 |
| KR | 2007010557 | 8/2007 |
| WO | WO2004/077194 | 9/2004 |

OTHER PUBLICATIONS

Sagiroglu et al, Keyloggers, IEEE, 2009, pp. 10-17.*
Olzak, Keystroke Logging, IEEE, Apr. 2008, pp. 1-13.*
Crossan et al, Head Tilting for Interaction in Mobile Contexts, ACM, Sep. 18, 2009, pp. 1-10.*
Voelter, Implementing Feature Variablity for Models and Code with Projectional Language Workbenches, ACM, 2010, pp. 41-48.*
"The Password Input Method which Used a Dummy Cursor" Research Disclosure Database No. 4551009, ISN 0374-4353, Mar. 2002.

* cited by examiner

METHOD AND DEVICE FOR SECURED ENTRY OF PERSONAL DATA

This application claims the benefit, under 35 U.S.C. §365 of International Application PCT/EP2011/059948, filed Jun. 15, 2011, which was published in accordance with PCI Article 21(2) on Dec. 22, 2011 in English and which claims the benefit of French patent application No. 1054742, filed Jun. 15, 2010.

SCOPE OF THE INVENTION

The invention relates to the general domain of user authentication notably via the entry of personal data such as a password. More particularly, the invention relates to a method and device for secured entry of personal data.

PRIOR ART

During the authentication of a user on a remote server using a browser, a web page presents fields for entry of a login and a password as well as a key to validate the entry of these items of personal data. The personal data are transmitted via the browser to the remote server. The remote server verifies the validity of data and thus authenticates the user. If the communication between the remote server and the browser is generally protected by encryption, the communication between the input peripheral device such as a keyboard or a mouse and the graphical user interface such as a browser is generally not secured. "Key-loggers" use this security weakness to spy on a user: they furtively record everything typed on the keyboard, the coordinates of a mouse click, the name of the running application, the URL of a browser, the date and time, then transmit this data to the author of the attack. Thus after analysis of the transmitted data, the author of the attack has access to the logins, passwords and other personal data that is usually well concealed. Other techniques of "key-loggers" use screen captures that enable the position of a mouse in a graphical window to be recorded. This capture is either continuous (which means filming the screen of the user), or triggered for example by a mouse click, which enables the quantity of data to be reduced while conserving their pertinence.

The key-loggers can be classed according to 3 categories:
hardware key-loggers: hardware devices connected to the keyboard, they are capable of capturing hundreds of keyboard strokes, are difficult to detect (as they resemble a standard keyboard adapter, they are sometimes integrated into the keyboard, and they can not be detected by software) but they require a physical access to the keyboard for their set-up and the recuperation of recorded data,
user level key-logger software applications: these devices exploit the software function that manages the keyboard (for example the Windows function SetWindowsHookEx( )), these devices are far more prevalent as they can be remotely installed, they transmit the recorded data via a network and are not limited by the physical size of their memory, which enables key-logger applications to collect a lot of data, however they are easily detectable by anti-spy or anti-virus applications,
low level key-logger software applications: these software devices operate at kernel level and use data directly received from peripheral devices such as the keyboard, these key-logger applications are more difficult to detect than the previous applications because they are executed before any user level application starts.

Application methods exist to detect key-loggers but they do not enable hardware key-loggers or low level software key-loggers to be detected.

Other methods consist in encrypting communications between the keyboard and the user interface but these methods are inefficient in the light of hardware key loggers.

Finally, the use of a virtual keyboard enables the key-loggers to be bypassed as the user selects with a mouse the keys of the virtual keyboard to enter data. However, there are spy methods that carry out screen captures at each mouse click or that record the coordinates of the mouse click.

These methods present the technical problem of protection of personal data, such as logins and passwords, transmitted between an entry peripheral (such as a keyboard or a mouse) and a graphical user interface, particularly in relation to key-loggers, mouse click coordinates loggers or screen capture loggers.

SUMMARY OF THE INVENTION

The purpose of the invention is to overcome at least one of the disadvantages of the prior art by proposing a method for secured entry of personal data such that it comprises, for each item of personal data to be entered, a step of presentation of a virtual keyboard comprising keys and a first cursor, and a step of selection of a key corresponding to an item of personal data, remarkable in that the virtual keyboard also comprises at least one dummy cursor (501) and in that the position (502) on the virtual keyboard of the at least one dummy cursor (501) depends on the position of the first cursor (502).

According to a variant, the selection of a key is in accordance with the position of the first cursor on the key of the virtual keyboard during a time period greater than a first threshold.

Hence, the invention enables a password to be entered without using the keyboard and without clicking with the mouse rendering ineffective, the key-loggers, the mouse-click coordinate loggers or the screen captures triggered by the mouse-click.

According to a particularly advantageous aspect of the invention, the position of keys on the virtual keyboard presented for two successive items of personal information is the result of a random permutation.

According to another particularly advantageous aspect of the invention, it also comprises a step of presentation of a virtual keyboard after a period of inactivity of the first cursor greater than a second threshold, the position of the keys on the virtual keyboard presented after a period of inactivity of the first cursor being the result of a random permutation.

Thus, in these two highly advantageous modes of the invention, a screen capture of the virtual keyboard corresponding to each of the key positions is required by the author of the attack in order to find the password.

According to a particular characteristic of the invention, the movement on the virtual keyboard of the dummy cursor(s) depends on the movement of the first cursor and in particular randomly depending on the movement of the first cursor. According to a particular characteristic of the invention, the speed of the movement on the virtual keyboard of the dummy cursor(s) depends on the speed of the movement of the first cursor and in particular randomly depending on the speed of the movement of the first cursor.

Thus, in these highly advantageous modes of the invention, the screen capture of the virtual keyboard does not provide the author of the attack with the means to find the position of the first cursor on the virtual keyboard among the dummy cursors.

The invention also relates to a device for secured entry of personal data comprising a means for presentation of a virtual keyboard comprising keys and a first cursor, and a means for selection of a key corresponding to an item of personal information, remarkable in that the virtual keyboard also comprises at least one dummy cursor (501) and in that the position (502) on the virtual keyboard of the at least one dummy cursor (501) depends on the position of the first cursor (502).

The particular characteristics and advantages of the device for secured entry of personal data being the same as those of the method for secured entry of personal data, they are not repeated here.

BRIEF DESCRIPTION OF THE FIGURES

The invention will be better understood and illustrated by means of embodiments and advantageous implementations, by no means limiting, with reference to the figures in the appendix, wherein.

DETAILED DESCRIPTION OF EMBODIMENTS OF THE INVENTION

The general principle of the invention is based on the use of a virtual keyboard and on the selection of keys on the virtual keyboard triggered by a timeout. In the case for example of a key-logger, the use of a virtual keyboard enables the use of a hardware keyboard to be overcome, thus rendering a key-logger ineffective. In addition, in the case of a more sophisticated spying device that records a screen capture as soon as a virtual keyboard is presented to a user as well as the coordinates of a mouse-click, the selection of keys on a virtual keyboard triggered by a timeout that is to say without a mouse-click, makes this device type ineffective.

In computing, a click is, by onomatopoeia, pressure followed by a quick release, exerted by the user on one of the buttons of a mouse, or more generally of a pointing device.

Figure 1:
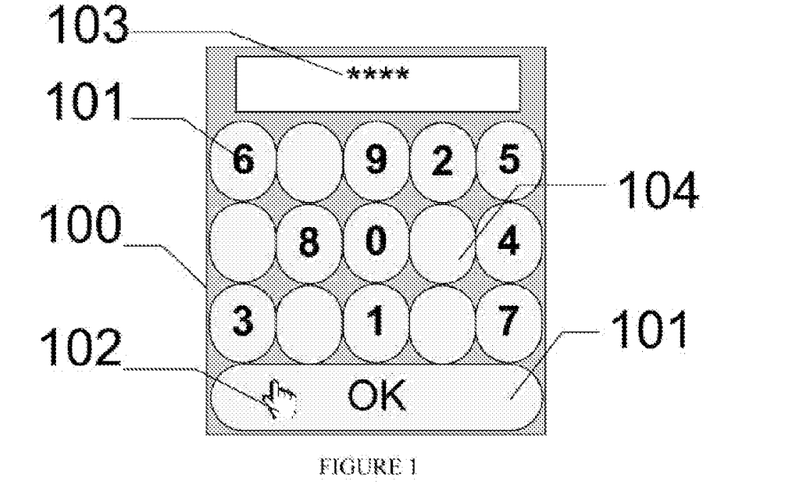
FIG. 1 shows a numerical virtual keyboard.

FIG. 1 shows a numerical virtual keyboard (100) according to an embodiment of the invention. A virtual keyboard (100) is a software application that enables a user to enter a password without using a hardware keyboard. A virtual keyboard comprises keys (101, 104), a cursor (102) and a password display field (103). The password is for example a series of 4 numbers. The cursor is moved on the virtual keyboard using a pointing device such as the mouse on the key corresponding to the number to be entered. Surprisingly, the selection of a key is not triggered by a mouse-click, but the selection of a key is triggered if the cursor remains positioned over a key of the virtual keyboard for a period of time greater than a threshold, one second for example.

Figure 2:
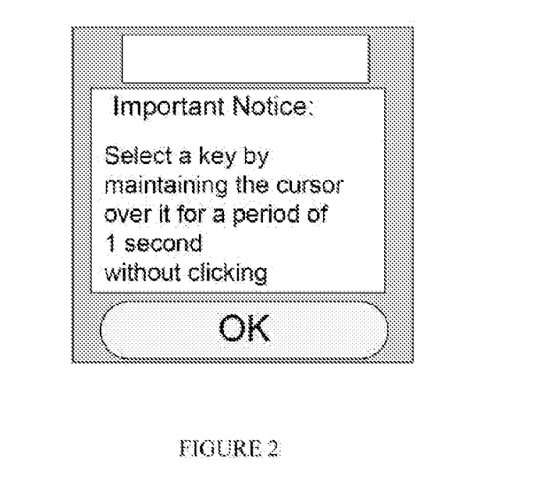
FIG. 2 shows the presentation of the method for entry by a user according to a preferred embodiment of the invention

FIG. 2 shows the presentation of the entry method by a user. According to an embodiment, before displaying the keys on the virtual keyboard, the software application indicates to the user to maintain the cursor over a key for a second without clicking.

According to the method of the invention, a user will repeat the following steps for each number of the password to be entered:
the user places the cursor over the key that he wants to select moving it with the mouse,
the cursor is positioned over the key for a period greater than a threshold of one second, the key is selected,
the user knows that the touch has been selected because a new star, masking the number selected, is displayed in the password display field,
the user can again move the cursor and repeat the steps of selection.

According to variants, the keys are not selected in the following cases:
if a user hits a key of the hardware keyboard,
If a user places the cursor over a dummy key, i.e. not displaying a number,
If a user presses one of the mouse buttons, i.e. a right-click, a middle-click or if he uses the scroll wheel.

In these cases, the message shown in FIG. 2 is then advantageously presented to the user to recall the method for selection of a number according to the invention.

The end of the entry of the password is validated by the selection of the "OK" key after the entry of 4 numbers composing the password. This selection is triggered, in accordance with a characteristic of the invention, if the curser is positioned over the "OK" key for a period greater than a threshold of one second. According to a variant, the selection of this key is possible by a click of the mouse over the key of the virtual keyboard or via the "Enter" key of the hardware keyboard.

Figure 3:
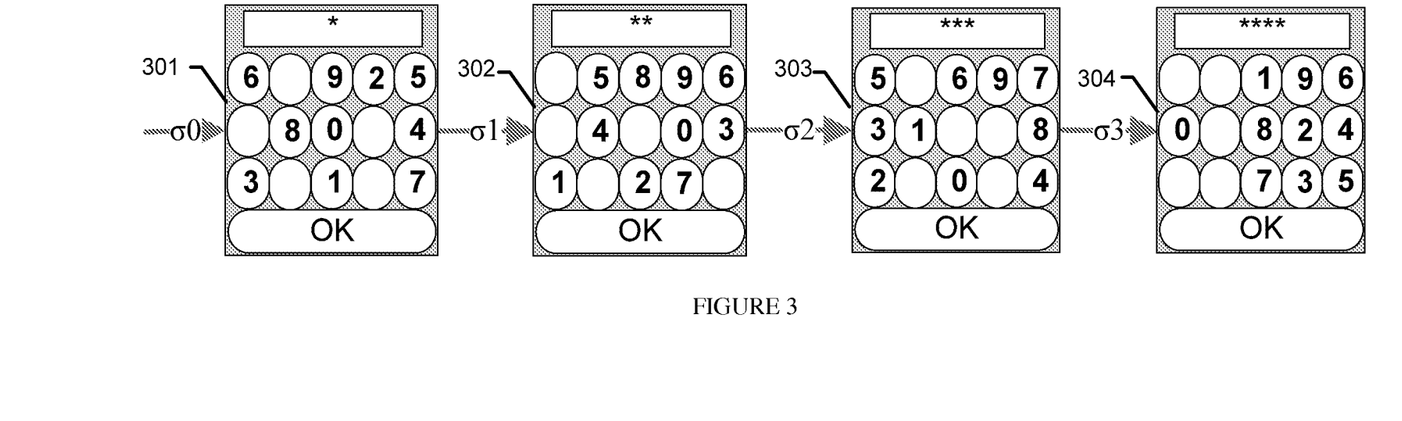
FIG. 3 shows the permutation of the position of keys on a virtual keyboard according to a preferred embodiment of the invention.

In addition, to increase the difficulty of interception of data between a graphical interface and an entry peripheral, the position of keys on the virtual keyboard presented for each of the 4 numbers to be entered is modified. According to a preferred embodiment the position of keys is the result of a random permutation. FIG. 3 shows the permutation of the position of keys on a virtual keyboard according to a preferred embodiment of the invention. If the permutation of keys on a virtual keyboard is known to those skilled in the art, this permutation is carried out between two entry requests of the password. Some on-line bank services notably use this method. However, the permutation of keys on a virtual keyboard between two successive password requests does not prevent a spy device from finding the password via a single screen capture. According to a distinctive characteristic, the permutation of keys is dynamically carried out after each selection of one of the 4 numbers of the password or after a period of inactivity of the cursor for a period of time greater than a certain threshold for example of two seconds. The successive random permutations $\sigma i$ of the position of keys noted ($i_0, \ldots, i_9$) are defined for example according to the following diagram:

(0, 1, 2, 3, 4, 5, 6, 7, 8, 9)$\rightarrow^{\sigma 0}$(0, 2, 9, 1, 3, 6, 5, 7, 4, 8)$\rightarrow^{\sigma 1}$(1, 9, 0, 2, 8, 7, 5, 4, 3, 6)$\rightarrow^{\sigma 2}$(8, 6, 3, 5, 1, 0, 7, 9, 4, 2)$\rightarrow^{\sigma 3}$(2, 4, 6, 9, 8, 1, 5, 3, 7, 0)

In addition, according to a variant, dummy keys are presented on the keyboard, these keys (noted as _) are inserted into the random permutations. The method shown in FIG. 3 comprises then the following steps:
a first virtual keyboard 301 is presented to the user who selects a first key, the position of keys (6, _, 9, 2, 5, _, 8, 0, _, 4, 3, _, 1, _, 7) on this keyboard 301 is the result of a permutation $\sigma 0$ of the position of keys from an initial state or since the last virtual keyboard presented, noted (0, 1, 2, 3, 4, 5, 6, 7, 8, 9, _, _, _, _, _, _)→$^{\sigma 0}$ (6, _, 9, 2, 5, _, 8, 0, _, 4, 3, _, 1, _, 7), a second virtual keyboard 302 for which the position of keys (_, 5, 8, 9, 6, _, 4, _, 0, 3, 1, _, 2, 7, _) is the result of a permutation σ1 of the position of the keys of the first virtual keyboard 301 is presented to the user who selects a second key, noted (6, _, 9, 2, 5, _, 8, 0, _, 4, 3, _, 1, _, 7)→$^{\sigma 1}$(_, 5, 8, 9, 6, _, 4, _, 0, 3, 1, _, 2, 7, _);

a third keyboard 303 then a fourth keyboard 304, respectively the result of a permutation σ2 of the second keyboard 302 then a permutation σ3 of the second keyboard 303, are successively presented to the user.

Thus, even if the spy device is capable of detecting Ie selection of keys on a virtual keyboard according to the invention, it will also need to capture 4 screens corresponding to each of the 4 successive positions of keys in order to be able to find the password from coordinates of the cursor on the virtual screen. Other variants implement periodic dynamic permutations. Thus if the real cursor remains inactive for a certain time for example over an inactive key or outside the window of the virtual keyboard, the position of keys on the virtual keyboard is advantageously dynamically permuted according to a new random permutation. Or again, after a period defined time period for example every minute, a new virtual keyboard is presented. Thus more than 4 captures will be necessary to find the password and the coordinates of selected keys must be analysed by association with one of the screen captures.

Figure 4:
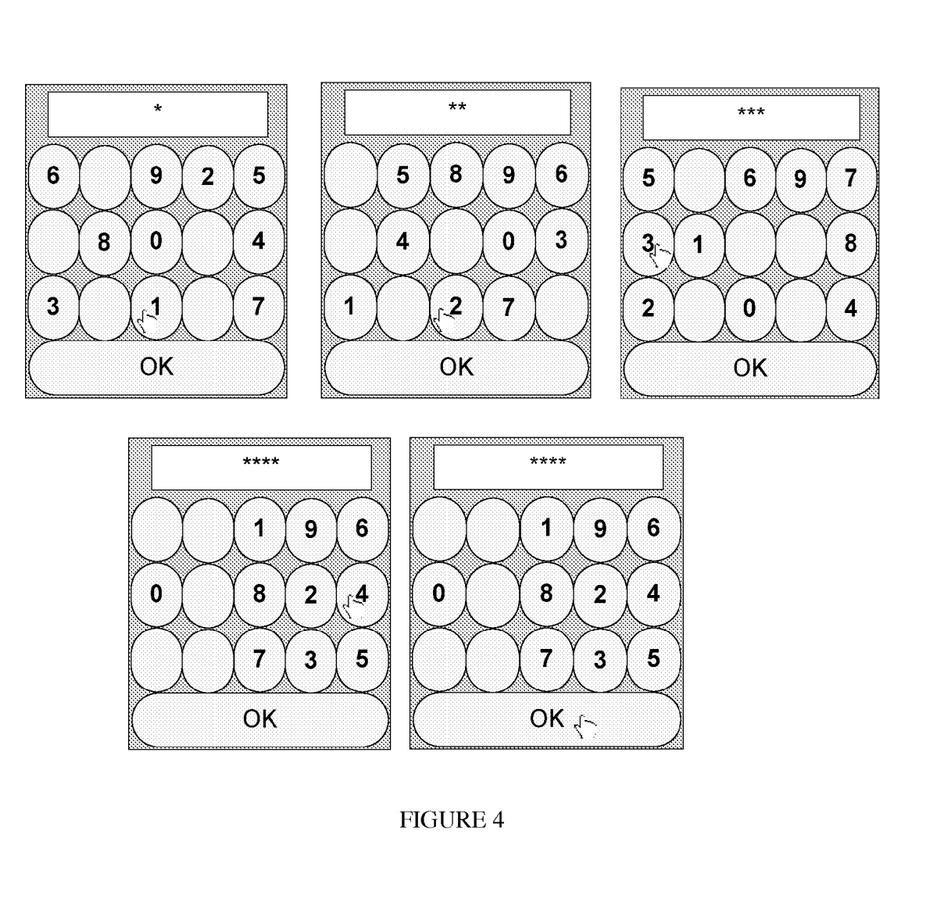
FIG. 4 shows a method for spying carrying out successive screen captures.

However, the improvements presented via these variants implementing a modification of the virtual keyboard may be insufficient faced with data interception devices on a graphical interface when these are adapted to perform a screen capture as soon as a virtual keyboard application is started then periodically for example every second. FIG. 4 shows a method for spying carrying out successive screen captures, From a selection among the successive screen captures, the password 1234 entered by the user is detected by the position of the cursor on the virtual keyboard as presented in FIG. 4.

According to a particular characteristic of the invention, the virtual keyboard also comprises at least one dummy cursor. These dummy cursors are placed over the keys of the virtual keyboard. Thus on a screen capture such as that shown in FIG. 5 the dummy cursors are identical to the first cursor known as the real cursor 502, as opposed to the dummy cursors. This variant is well adapted to prevent the detection of the password according to the method shown in FIG. 4.

The implementation of this variant requires the creation of dummy cursors identical to the real cursor in the virtual keyboard application. The cursors are represented on the screen by an icon. The use and management of a cursor icon displaced by a mouse in a software application is carried out according to two preferred modes. According to a first mode, the application uses the icon of the operating system typically the hand or the arrow in Windows. According to a second embodiment, the application uses its own icon that may be different to that of the cursor of the operating system. According to the first mode, the application recovers the icon of the real cursor to display dummy cursors. According to the second mode, the application exchanges the icon of the real cursor for the cursor of the application when the real cursor is placed in the graphical window of the virtual keyboard application. In addition, for a better security of the display of identical dummy and real cursors, the application periodically verifies, for example every 100 ms, that the icon of the real cursor is not modified by another application particularly by a password spying application. The dummy cursors would then be different from the real cursor and the password could be detected. If the virtual keyboard application detects a modification of the icon of the real keyboard, it stops.

Figure 5:
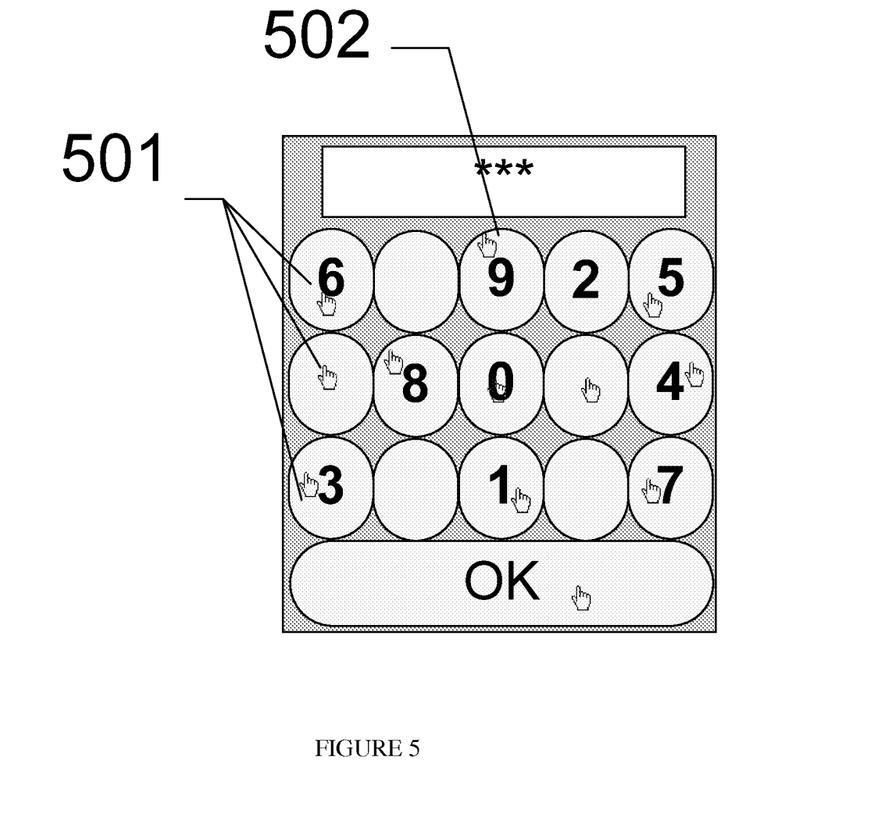
FIG. 5 shows the dummy cursors on a virtual keyboard according to a particular embodiment.

According to an improvement, as soon as a user places the real cursor over a key of the virtual keyboard with a dummy cursor, the application deletes the dummy cursor so that 2 cursors are not present simultaneously over a key. When the user moves the real cursor from this key, the dummy cursor is again displayed by the application. According to another improvement, the position of dummy cursors is dissymmetric, that is to say they must not be positioned over a same line of the virtual keyboard, or on the same coordinates of keyboard keys, for example under the number 6 and to the left of the number 3 as represented in FIG. 5. These improvements make the detection of dummy cursors more difficult as the real cursor 502 displaced by a user using the mouse can be differentiated from dummy cursors 501 in that it is not aligned with these latter cursors.

Figure 6:
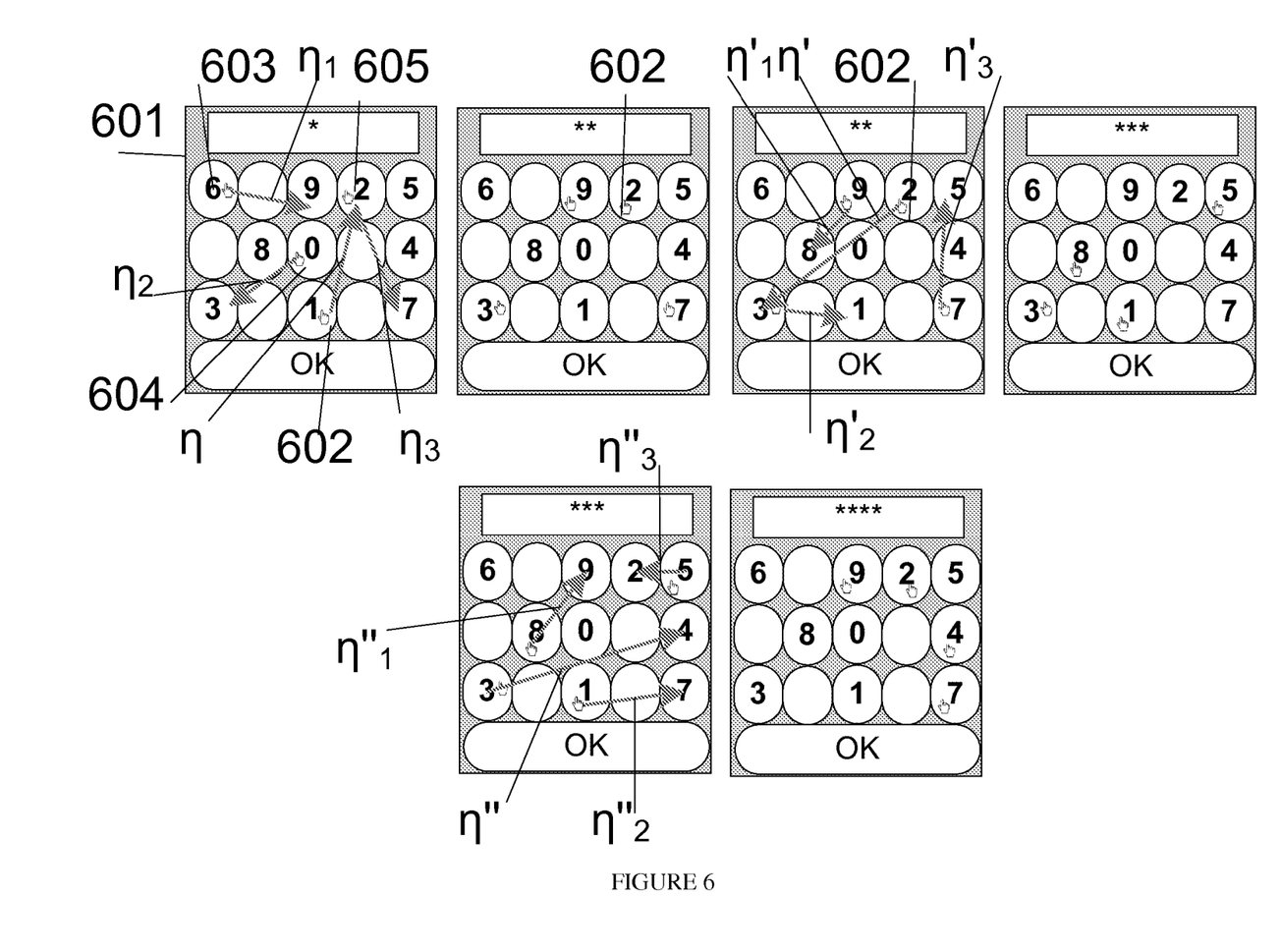
FIG. 6 shows the random movement of dummy cursors on a virtual keyboard according to an embodiment.

According to another particular characteristic of the invention, the position on the virtual keyboard of the dummy cursor(s) depends on the position of the first cursor. Thus for a better protection of the entry of the password, the virtual keyboard shows mobile dummy cursors as opposed to static dummy cursors. When the real cursor is displaced over the keyboard, the dummy cursors are also displaced in different directions. When the real cursor is placed over a key, the dummy cursors are also placed over distinct keys. As the user is aware of the movement of the mouse, he is able to differentiate the real cursor from the dummy cursors. For instance, a user can perform a circle with his mouse and identified the real cursor as the cursor following a circle movement by opposition to dummy cursor displaced in different directions. According to an improvement, the movement over the virtual keyboard of the dummy cursor(s) depends on the movement of the first cursor, and in particular depends randomly on the movement of the first cursor. FIG. 6 shows the random movement of dummy cursors over a virtual keyboard according to this improvement. The virtual keyboard 601 comprises a first cursor called the real cursor 602, and 3 dummy cursors 603, 604, 605. The movement of the real cursor is noted as η. The respective movement of these dummy cursors is noted as η1, η2, η3. The movements η1, η2, η3 are a function of a random value and of the movement η. According to an embodiment variant of this function, the coordinates (x1, y1) of a dummy cursor are the result of the subtraction of coordinates (x, y) of the first cursor and random numbers Rx, Ry or (x1=x−Rx, x2=y−Ry). The method shown in FIG. 6 comprises then the following steps:

a virtual keyboard 601 comprising a real cursor 602 and 3 dummy cursors 603, 604, 605 are presented to the user, the user moves the real cursor 602 according to a movement η to select a first key 2, the dummy cursors 603, 604 and 605 are displaced by the application respectively according to the movement η1, η2, η3 a function of a random value and the movement η, the user maintains the real cursor 602 over a first key 2 of the virtual keyboard 601, the dummy cursors 603, 604 and 605 are static, the user moves the real cursor 602 according to a movement η' to select a second key 3, the dummy cursors 603, 604 and 605 are displaced by the application respectively according to the movement η'1, η'2, η'3 a function of a random value and the movement η', the user maintains the real cursor 602 over a second key 3 of the virtual keyboard 601, the dummy cursors 603, 604 and 605 are static, the user reiterates the two last steps until the complete entry of the password then selects the "OK" key.

According to an improvement, the speed of the movement of dummy cursors depends on the speed of the movement of the real cursor. The speed of dummy cursors and real cursor compared to the speed applied by the user to the mouse is another way for a user to differentiate real cursor from dummy cursors.

Figure 7:
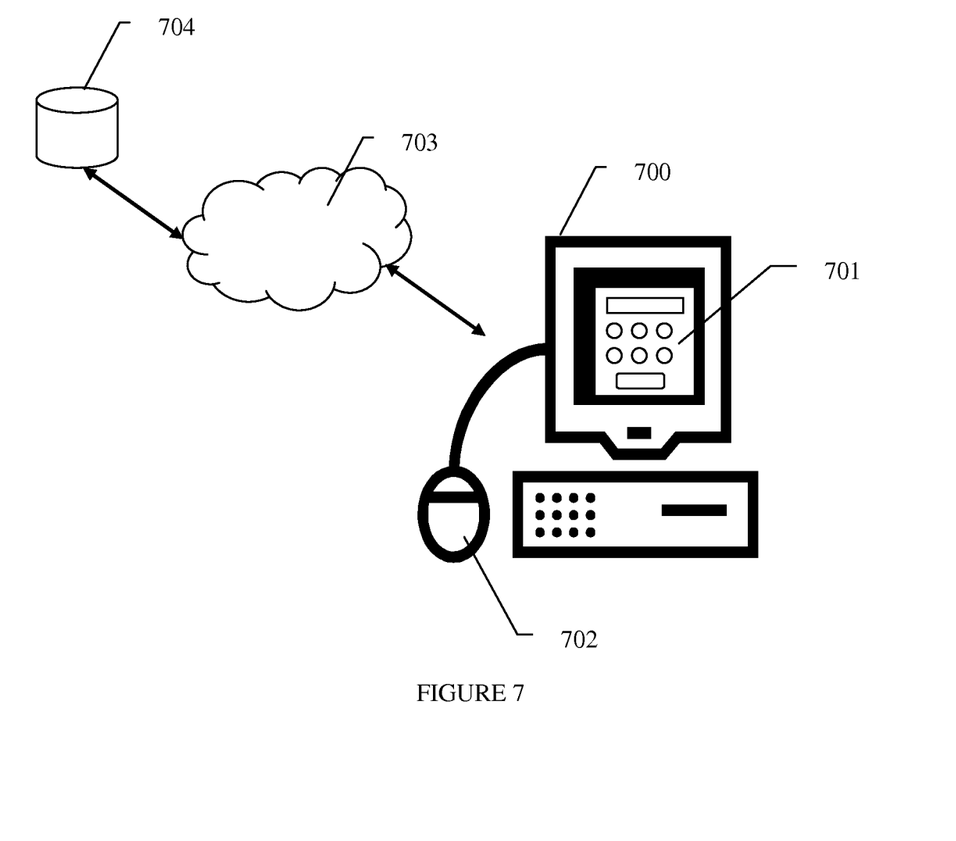
FIG. 7 shows a device for secured entry of personal data according to a preferred embodiment of the invention.

FIG. 7 shows a device for secured entry of personal data according to a preferred embodiment of the invention. The device 600 for secured entry of personal data is for example a personal computer equipped with peripheral devices such as a keyboard and a pointing device, a mouse 602. The personal computer comprises a screen presenting a virtual keyboard 601 to a user. A browser operating on this computer presents a Web page that enables for example a password to be entered in order to access a remote server 704 offering banking services via a network 703. The browser carrying out the entry of the password on a virtual keyboard is characterized in that the selection of a key on the virtual keyboard is a function of the positioning of the cursor over the key of the virtual keyboard for a time period greater than a first threshold.

The particular characteristics and advantages of the device for secured entry of personal data being the same as those of the method for secured entry of personal data, they are not repeated here.

The device is not limited to the embodiment described in FIG. 7. In particular, the device according to the invention is compatible with a telephone or a PDA also enabling access to remote servers or again a password to be entered on a smart card. The device is also compatible with a digital decoder implementing for example a system for protection of rights such as Smart Pro by which a user authenticates himself on a smart card in order to launch the application.

Naturally, the invention is not limited to the embodiments previously described. In particular, the invention is compatible with a virtual keyboard comprising keys corresponding to alphanumeric characters and symbols.

According to another variant, another pointing device than the mouse is used among which can be cited a tactile screen, or the finger on a tactile pad.

The invention claimed is:

1. A method for secured entry of personal data comprising, for each item of personal data:
   a) generation, by a computing device, of a user interface including a virtual keyboard comprising keys, a first cursor and at least one dummy cursor, the at least one dummy cursor being generated to overcome a "key-logger" attack,
   b) selecting, by the computing device upon receipt of a user command from a peripheral device, a key corresponding to said item of personal data,
   controlling a position on the virtual keyboard of said at least one dummy cursor, by the computing device, based on a position of the first cursor on said virtual keyboard wherein movement over the virtual keyboard of said at least one dummy cursor depends on movement of the first cursor; and
   wherein a speed of the movement over the virtual keyboard of said at least one dummy cursor depends on a speed of the movement of the first cursor and wherein a position of the keys on the virtual keyboard presented for two successive items of personal data is a result of a random permutation.

2. The method for secured entry of personal data according to claim 1 further comprising presentation of a virtual keyboard after a period of inactivity of said first cursor greater than a second threshold, a position of keys on the virtual keyboard presented after a period of inactivity of said first cursor being a result of a random permutation.

3. The method for secured entry of personal data according to claim 1 wherein the first cursor is moved on the virtual keyboard by using a pointing device.

4. The method for secured entry of personal data according to claim 3, wherein the pointing device is a mouse.

5. A device for secured entry of personal data comprising:
   a) a computing device that generates a user interface including a virtual keyboard comprising keys, a first cursor and at least one dummy cursor, the at least one dummy cursor being generated to overcome a "key-logger" attack,
   b) a screen for display of the user interface;
   c) a pointing device for selection, upon receipt of a user command, of a key corresponding to an item of personal information,
      wherein a position at which the at least one dummy cursor is displayed on the virtual keyboard is controlled based on a position of the first cursor on the virtual keyboard and wherein movement over the virtual keyboard of said at least one dummy cursor depends randomly on movement of the first cursor; and
   wherein a speed of movement over the virtual keyboard of said at least one dummy cursor depends on a speed of the movement of the first cursor and a position of keys on the virtual keyboard presented for two successive items of personal data is a result of a random permutation.

6. The device for secured entry of personal data according to claim 5 wherein the device presents a virtual keyboard after a period of inactivity of said first cursor greater than a second threshold, a position of keys on the virtual keyboard after a period of time of inactivity of said first cursor being a result of a random permutation.

7. A device for secured entry of personal data comprising:
   a computing device including a processor that generates a user interface on a screen including a virtual keyboard comprising keys, a first cursor and at least one dummy cursor, the at least one dummy cursor being generated by the processor to overcome a "key-logger" attack, the computing device including an input for receiving a user command, from a pointing device, of a key corresponding to an item of personal information,
   wherein a position at which the at least one dummy cursor is displayed on the virtual keyboard is controlled by the processor based on a position of the first cursor on the virtual keyboard and wherein movement over the virtual keyboard of said at least one dummy cursor is controlled by the processor and depends on movement of the first cursor; and
   wherein a speed of movement over the virtual keyboard of said at least one dummy cursor is controlled by the processor and depends on a speed of the movement of the first cursor and a position of keys on the virtual keyboard presented for two successive items of personal data is a result of a random permutation.

8. The device for secured entry of personal data according to claim 7 wherein the computing device presents a virtual keyboard after a period of inactivity of said first cursor greater than a second threshold, a position of keys on the virtual keyboard after a period of time of inactivity of said first cursor being a result of a random permutation.

* * * * *